United States Patent
Naidoo

(10) Patent No.: US 12,506,768 B2
(45) Date of Patent: Dec. 23, 2025

(54) REAL-TIME THREAT DETECTION FOR ENCRYPTED COMMUNICATIONS

(71) Applicant: Snode Technologies (Pty) Ltd, Centurion (ZA)

(72) Inventor: Nithendren Naidoo, Centurion (ZA)

(73) Assignee: SNODE TECHNOLOGIES (PTY) LTD, Centurion (ZA)

( * ) Notice: Subject to any disclaimer, the term of this patent is extended or adjusted under 35 U.S.C. 154(b) by 302 days.

(21) Appl. No.: 18/055,554

(22) Filed: Nov. 15, 2022

(65) Prior Publication Data

US 2023/0156034 A1    May 18, 2023

(30) Foreign Application Priority Data

Nov. 16, 2021   (ZA) .................................. 2021/09084

(51) Int. Cl.
*H04L 9/00* (2022.01)
*H04L 9/40* (2022.01)

(52) U.S. Cl.
CPC ...... *H04L 63/1441* (2013.01); *H04L 63/0457* (2013.01); *H04L 63/1416* (2013.01); *H04L 63/1425* (2013.01)

(58) Field of Classification Search
CPC ............. H04L 63/1441; H04L 63/0457; H04L 63/1416; H04L 63/1425; H04L 63/0428; H04L 63/1408
See application file for complete search history.

(56) References Cited

U.S. PATENT DOCUMENTS

| | | | |
|---|---|---|---|
| 10,986,121 B2 | 4/2021 | Stockdale et al. | |
| 11,194,901 B2 | 12/2021 | El-Moussa et al. | |
| 2017/0063907 A1* | 3/2017 | Muddu | G06F 40/134 |
| 2017/0171228 A1* | 6/2017 | McLean | H04L 63/1416 |
| 2017/0324758 A1* | 11/2017 | Hart | H04L 63/0428 |
| 2018/0191771 A1* | 7/2018 | Newman | H04L 63/20 |
| 2020/0007568 A1* | 1/2020 | Frayman | H04B 10/1149 |
| 2020/0302052 A1* | 9/2020 | El-Moussa | H04L 63/1425 |
| 2023/0308458 A1* | 9/2023 | Varsanyi | H04L 63/166 |

FOREIGN PATENT DOCUMENTS

WO   2015128613 A1   9/2015

\* cited by examiner

*Primary Examiner* — Syed M Ahsan
(74) *Attorney, Agent, or Firm* — Osha Bergman Watanabe & Burton LLP

(57) ABSTRACT

A system and method for real-time threat detection for encrypted communications are provided. A method includes monitoring a data stream in a network, such as an M2M network, including encrypted message data and non-encrypted metadata associated with the encrypted message data being transmitted between endpoints on the network. The method includes extracting data stream metadata from the data stream including data points extracted from the non-encrypted metadata. The method includes enriching the data stream metadata with contextual data relating to one or more of threat, vulnerability and reputation data points and being obtained from one or more signal sources to output enriched data. The enriched data is analysed and a risk probability score associated therewith is calculated. An action is initiated in accordance with the risk probability score so as to mitigate a threat present on the network.

20 Claims, 10 Drawing Sheets

REAL-TIME THREAT DETECTION FOR ENCRYPTED COMMUNICATIONS

CROSS-REFERENCE TO RELATED APPLICATIONS

This application claims priority from South African patent application number 2021/09084 filed on 16 Nov. 2021, which is incorporated by reference herein.

FIELD OF THE INVENTION

This invention relates to real-time threat detection for encrypted communications. The invention may find particular, but not exclusive, application in real-time threat detection for encrypted machine-to-machine (M2M) communications.

BACKGROUND TO THE INVENTION

Computer systems and networks have traditionally relied on signature detection technologies to identify threats such as malware (malicious software). Recently, more progressive approaches leveraging applied intelligence and artificial intelligence have been introduced. However, there has been no significant breakthrough in the ability to detect threats in encrypted communications without decryption and DPI (Deep Packet Inspection).

M2M communications is a highly specialized area of networked computing primarily relating to autonomous inter-machine communication for signalling or data acquisition. Historically, this field was closely tied to ICS (Industrial Control Systems), Medical OT (Operational Technology) platforms and SCADA (Supervisory Control and Data Acquisition) systems. However, today the emergence of the Internet-of-Things (IoT), autonomous vehicles, drone and wearable technologies all contribute to a growing M2M landscape.

Rapidly evolving with this emerging technology is the threat landscape. Cyber threats are advanced and persistently driving the need for secure, encrypted communications between trusted platforms. A supporting real-time threat detection system is required to identify and mitigate high risk events in encrypted communications. There is accordingly scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a computer-implemented method for threat detection for encrypted communications, the method comprising: monitoring a data stream in a network, the data stream including encrypted message data and non-encrypted metadata associated with the encrypted message data being transmitted between endpoints on the network; extracting data stream metadata from the data stream, the data stream metadata including data points extracted from the non-encrypted metadata; enriching the data stream metadata with contextual data relating to one or more of threat, vulnerability and reputation data points and being obtained from one or more signal sources to output enriched data; analysing the enriched data and calculating a risk probability score associated therewith; and, initiating an action in accordance with the risk probability score so as to mitigate a threat present on the network.

The method may include storing one or more of the data stream metadata, the enriched data and aggregated data in an in-memory storage component for fast access. This may include storing the one or more of the data stream metadata, the enriched data and aggregated data in a key-value store in which each data point is stored in record associated with a key.

Analysing the enriched data may include using one or more of statistical analysis, machine learning and anomaly detection to calculate the risk probability score.

Analysing the enriched data may include performing statistical analysis on the enriched data. Performing statistical analysis may include performing statistical analysis based on volumetric, frequency and distribution patterns. The statistical analysis may include time-based statistical analysis performed using mini-batch gradient descent processing. The statistical analysis may include using one or more of: Shewhart Control Charts, Fast-Fourier Transforms, Holt-Winters and Markov Modelling.

Analysing the enriched data may include performing anomaly detection on the enriched data. Performing anomaly detection may include inputting one or both of enriched and aggregated data and optionally the output of statistical analysis and outputting data points relating to one or more of: event anomalous score; anomaly detection method; associated risk rating; and event description.

Analysing the enriched data may include performing event classification on the enriched data. Performing event classification may include inputting one or both of enriched and aggregated data and optionally the output of statistical analysis and outputting data points relating to one or more of: event classification; classification probability; event risk rating; event description; and the like.

The method may include collecting and assessing the contextual data for a level of accuracy and certainty, including tagging a weighted score to the contextual data for use in calculating the risk probability score.

Calculating the risk probability score may include using the outputs of one or both of event classification and anomaly detection. Calculating the risk probability score may include using Markov-Modelling to determine risk probability score. Calculating the risk probability score may include using a weighted score which may be tagged to the contextual data.

The method may include aggregating the enriched data to output aggregated data, including aggregating statistics of all monitored data communications on the network. Analysing the enriched data may include analysing the aggregated data.

Initiating the action may include initiating one or more of the following actions: containing threat activity; creating a threat detection alert; allowing a connection; whitelisting; blacklisting and the like.

The one or more signal sources from which the contextual data is obtained may include a human source and a technical source.

The method may include providing feedback for reinforcement learning to improve accuracy and reduce false positives and false negatives, wherein the feedback is in the form of new training data.

In accordance with a further aspect of the invention there is provided a system for threat detection for encrypted communications including a memory for storing computer-readable program code and a processor for executing the computer-readable program code, the system comprising: a monitoring component for monitoring a data stream in a network, the data stream including encrypted message data and non-encrypted metadata associated with the encrypted message data being transmitted between endpoints on the network; a data stream metadata extraction component for extracting data stream metadata from the data stream, the data stream metadata including data points extracted from the non-encrypted metadata; a metadata enriching component for enriching the data stream metadata with contextual data relating to one or more of threat, vulnerability and reputation data points and being obtained from one or more signal sources to output enriched data; a threat assessment component for analysing the enriched data and calculating a risk probability score associated therewith; and, an actioning component for initiating an action in accordance with the risk probability score so as to mitigate a threat present on the network.

In accordance with a further aspect of the invention there is provided a computer program product for threat detection for encrypted communications, the computer program product comprising a computer-readable medium having stored computer-readable program code for performing the steps of: monitoring a data stream in a network, the data stream including encrypted message data and non-encrypted metadata associated with the encrypted message data being transmitted between endpoints on the network; extracting data stream metadata from the data stream, the data stream metadata including data points extracted from the non-encrypted metadata; enriching the data stream metadata with contextual data relating to one or more of threat, vulnerability and reputation data points and being obtained from one or more signal sources to output enriched data; analysing the enriched data and calculating a risk probability score associated therewith; and, initiating an action in accordance with the risk probability score so as to mitigate a threat present on the network.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Aspects of the present disclosure relate to a system and method for real-time threat detection for encrypted communications. The system and method described herein provide real-time threat detection and prevention technology which secures encrypted networks. The described system and method may find particular application in real-time threat detection and prevention in machine-to-machine (M2M) networks, although other applications are anticipated. An M2M network may comprise multiple endpoints, such as industrial instrumentation sensors, that are interconnected for any purpose (e.g., sensor data acquisition, autonomous vehicles, industrial automation, etc.). Further, with the emergence of the Internet-of-Things (IoT), an M2M network may include endpoints being, for example, personal devices and appliances, such as portable computing devices, wearable computing devices, smart appliances, home assistants and the like.

Unlike existing solutions and detection methods, the system and method described herein detect and/or prevent threats in encrypted communications without performing deep packet inspection (DPI) or decryption (such as SSL interception). The system and method described herein may be arranged to passively detect and alert or proactively respond to active threats in real-time. Such response may be automatic or without human intervention so as to provide a fully automated prevention system.

Figure 1:
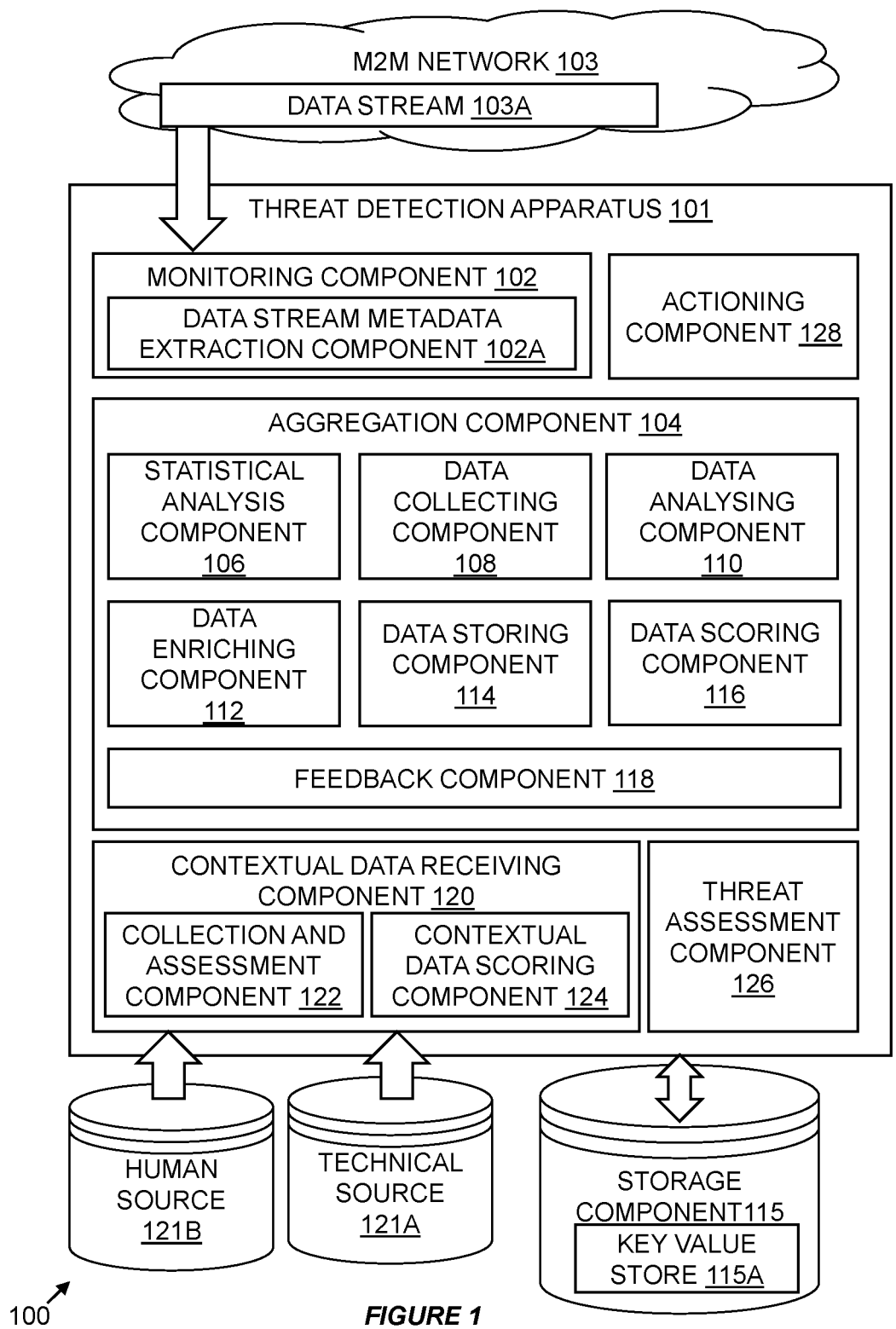
FIG. 1 is a schematic diagram which illustrates one example embodiment of a threat detection system according to aspects of the present disclosure.

FIG. 1 is a schematic diagram which illustrates one example embodiment of a threat detection system (100) according to aspects of the present disclosure.

The system (100) may include a threat detection apparatus or device (101). The apparatus (101) may include a processor for executing the functions of components described below, which may be provided by hardware or by software units executing on the apparatus (101). The software units may be stored in a memory component and instructions may be provided to the processor to carry out the functionality of the described components. In some cases, for example in a cloud computing implementation, software units arranged to manage and/or process data on behalf of the apparatus (101) may be provided remotely.

The apparatus (101) includes a monitoring component (102) that passively monitors traversing communications on an M2M network (103) and an aggregation component (104) that aggregates various attributes (e.g., M2M data communication frequency). The monitoring component (102) may be arranged to monitor an event or data stream (103A) on the network (103).

The data stream (103A) may include multiple packets being transmitted between endpoints on the network (103). Multiple packets may form a connection between two or more endpoints and multiple connections may form what may be termed a conversation. Multiple conversations may form a transaction. A transaction may therefore involve the exchange of a plurality of packets between endpoints on the network. There may be multiple transactions occurring simultaneously on the network.

Each packet may include message data and metadata. The message data may be encrypted while the metadata may be non-encrypted. In other words, the metadata may be sent "in the clear" while the message data to which the metadata relates may be sent in an encrypted form. In some example embodiments, each packet includes a payload containing the message data and a header containing the metadata.

The data stream may therefore include encrypted message data and non-encrypted metadata associated with the encrypted message data being transmitted between endpoints on the network. The non-encrypted metadata may include or relate to or generally be associated with "signals" or "signal events" (which may be termed "internal signals" or "internal signal events"). The monitoring component may include a data stream metadata extraction component (102A) arranged to extract data stream metadata from the data stream. The data stream metadata includes data points extracted from the non-encrypted metadata (and may thus include data points relating to signal events and the like). The data points may be referred to as metadata in that they provide information about data traversing the data stream (103A).

The aggregation component (104) may be arranged to aggregate data including for example multivariate data including data stream metadata and/or contextual data received from other sources. The aggregated data may thus include data points associated with the internal and/or external signal events.

Figure 2:
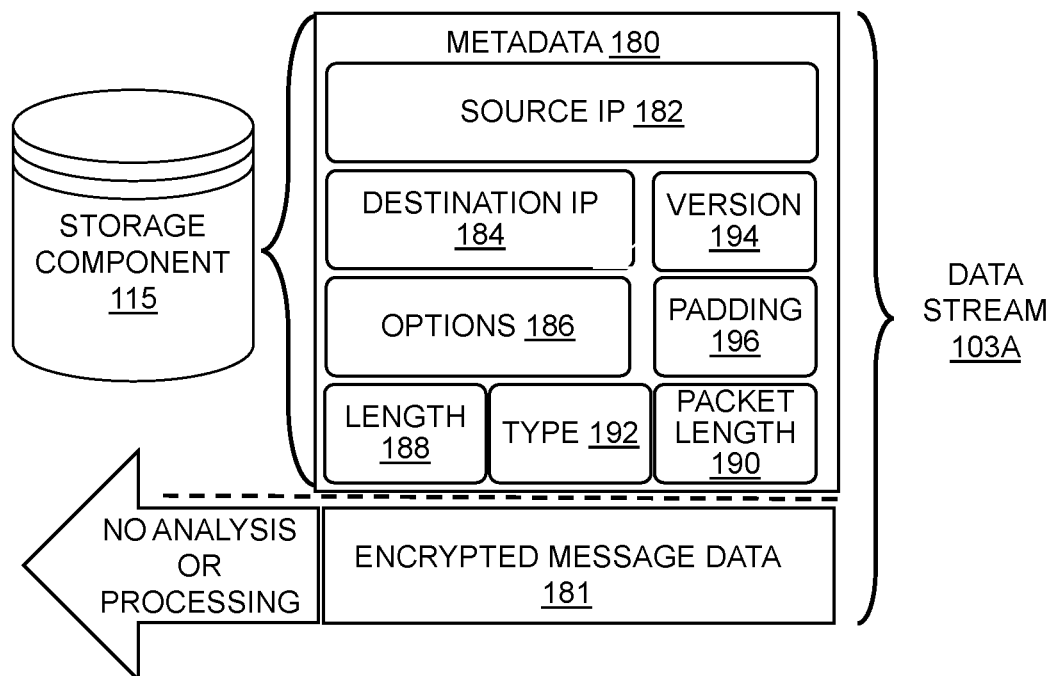
FIG. 2 is a schematic diagram which illustrates and example data stream and data stream metadata that may be used for threat detection according to aspects of the present disclosure.

Examples of non-encrypted metadata (180) that might form part of the extracted data stream metadata that could be used for threat detection include communication metadata illustrated in FIG. 2, for example including one or more of: source IP address (182), destination IP address (184) and data points relating to: options (186), length (188), packet length (190), type (192), version (194), padding (196), etc. Non-encrypted metadata may further include data points relating to source device identifier, destination device identifier, device or user profile and the like. In the example illustrated in FIG. 2, the data stream metadata is obtained from a transmission control protocol (TCP) network packet. The actual, encrypted message data (181) transmitted in the data stream (103A) is not intercepted or analysed. Metadata (180) attributes which are extracted for analysis are stored within a storage component (115), which may provide an in-memory key-value store for fast analytics processing at internet scale.

Returning to FIG. 1, the apparatus (101) includes a statistical analysis component (106) that utilizes metadata and performs statistical analysis based on, for example: volumetric, frequency, and distribution patterns. The statistical analysis component (106) may perform time-based statistical analysis using mini-batch gradient descent processing in order to avoid supervised learning methods requiring data-sets, time, and training to recognize threats. Mini-batch gradient descent splits training data into smaller, more frequent, sets. The aggregation component (104) may be configured to aggregate the statistics of all monitored data communications, regardless of protocol or encryption type.

The apparatus (101) may include components (108, 110, 112) for collecting, analysing and enriching metadata. The data collecting component (108) may be arranged to collect data points from one or both of the monitoring component (102) and a contextual data point receiving component (120). The data enriching component (112) may be arranged to enrich the stream data metadata using contextual data collected by the collecting component.

The apparatus (101) may include a data storing component (114) arranged to store the data points in the storage component (115) accessible to the apparatus. The storage component (115) may provide in-memory storage for fast access to the data points. A key-value store (115A) may be maintained in the storage component (115) and accessible to the apparatus. The key-value store (115A) may be configured for storing, retrieving, and managing associative arrays, and a data structure (such as a dictionary or hash table). The key-value store may use memory efficiently, leading to large performance gains in certain workloads.

Figure 3:
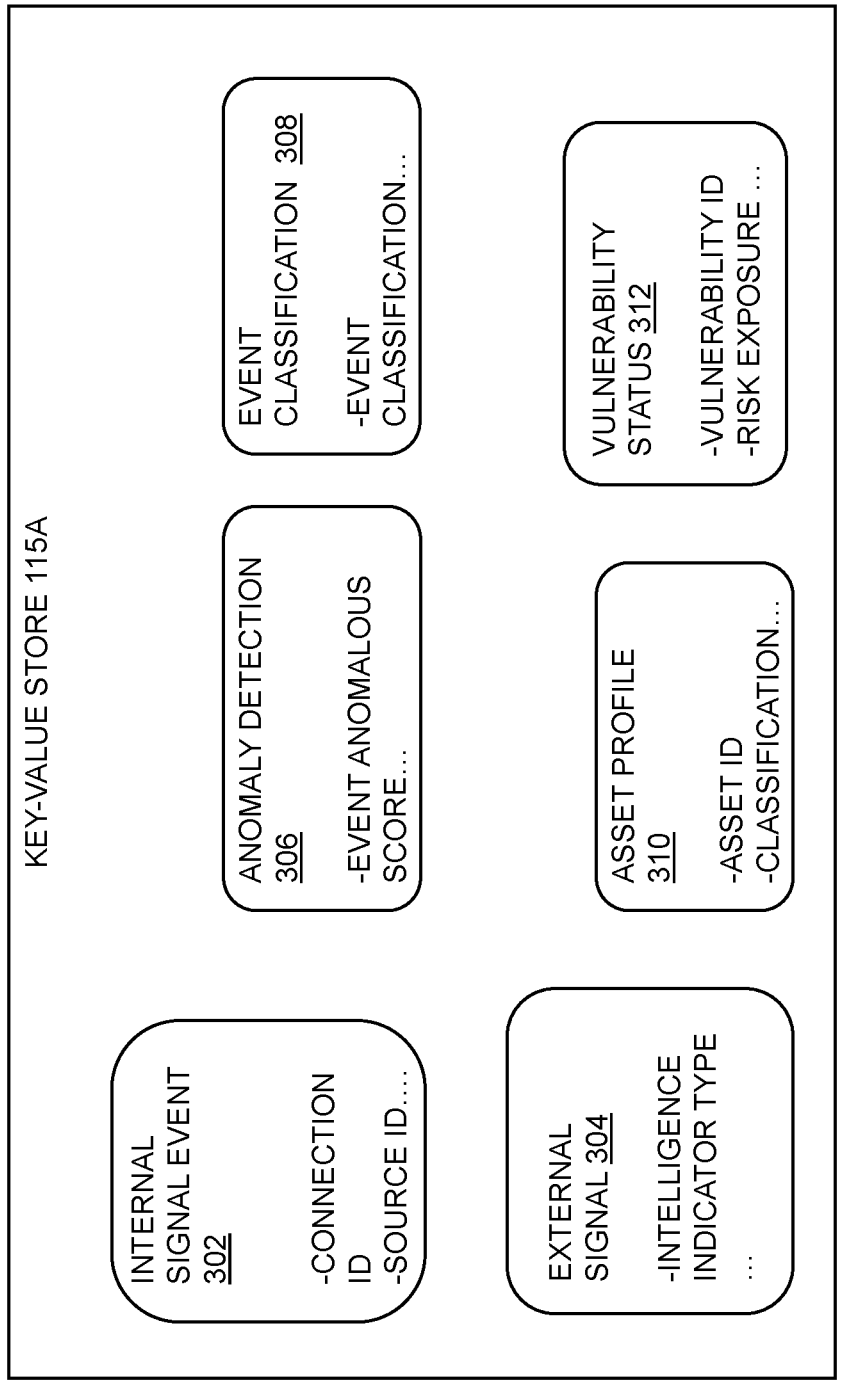
FIG. 3 is a schematic diagram which illustrates a key-value store according to aspects of the present disclosure.

An example configuration of the key-value store (115) is illustrated in greater detail in FIG. 3. The key-value store may store data points related to an internal signal event (302) and an external signal (304). The key-value store may store data points relating to one or more of: anomaly detection (306); event classification (308); asset profile (310); vulnerability status (312) and the like. The data points may be stored in the key value store in association with the transaction, connection and/or endpoints to which they relate.

Internal signal event (302) data points may include one or more of: connection ID; source ID; source description; destination ID; destination description; known malicious flag; known vulnerable flag; anomalous activity score; connection statistics; protocol type; risk probability score; and the like. External signal (304) data points may include one or more of: intelligence indicator type; intelligence indicator ID; indicator value; relevance (such as accurate, timely, etc.); risk rating; and the like. Anomaly detection (306) data points may include one or more of: event anomalous score; anomaly detection method; associated risk rating; event description; and the like. Event classification (308) data points may include one or more of: event classification; classification probability; event risk rating; event description; and the like. Asset profile (310) data points may include asset ID, classification, asset description and the like. Vulnerability status (312) data points may include one or more of: vulnerability ID; risk exposure rating; attack surface score; exploitability potential; vulnerability description; and the like. Vulnerability status data points may be enriched data points and may be used to assist the risk probability scoring. The data points mentioned in the foregoing may be stored in records in the key-value store and each data point may be uniquely associated with a key for retrieving the record with which it is associated. It should be appreciated that in the above only the key data elements are mentioned, which show the relationship between internal and external signals. It should further be appreciated that automated signal enrichment and analysis produces various other data points that label each record as either a malicious threat or a non-malicious M2M connection.

Returning to FIG. 1, the apparatus (101) may include a data scoring component (116) arranged to score the data points (or attributes thereof) based on the threat detection probability. The apparatus (101) may include a feedback component (118) arranged to feed the data and associated scores into the system to enhance future threat predictions.

The apparatus (101) may include the contextual data receiving component (120), which may be arranged to receive contextual data points (e.g. including data points relating to external signals) of threat indicators from other threat monitoring sources, for example including technical sources (121A) and human sources (121B). The contextual data receiving component (120) may include a collection and assessment component (122) arranged to collect and assess contextual data for a level of accuracy and certainty. The contextual data receiving component (120) may include a contextual data scoring component (124) arranged to tag a weighted score to the contextual data (including threat indicator) based on the assessment. The score may be used to calculate detection probability.

The apparatus (101) may include a threat assessment component (126) arranged to assess and/or detect a threat in the network (103) based on the metadata and associated data points. The threat assessment component may be arranged to use one or more of anomaly detection, event classification and risk probability scoring to assess and/or detect threats in the network. The threat assessment component may implement analytics using aggregated multivariate data, statistical analysis, anomaly detection and semi-supervised classification. The threat assessment component may be arranged to derive or compute a risk probability score for each encrypted transaction, connection and/or machine profile on the network (103).

The apparatus (101) may include an actioning component (128) arranged to initiate one or more actions based on the threat detection or threat assessment. The actions may be initiated autonomously (i.e. without human intervention). The actioning component (128) may be arranged to initiate an action in accordance with the risk probability score so as to mitigate one or more threats present on the network. The actioning component may be configured to initiate one or more of the following actions: contain threat activity; create threat detection alert; allow connection; whitelist; blacklist and the like. The actioning component (128) may for example output to an alerting sub-system, such as email or SMS (short messaging service) gateway. The actioning component may actively defend devices using an automated countermeasure deployment. Automated countermeasure deployments use a variety of techniques, such as malicious connection termination or interception, disarming threat actors and rendering their tools and exploits powerless. This automated response capability is real-time risk mitigation and will not automate remediation.

Figure 4:
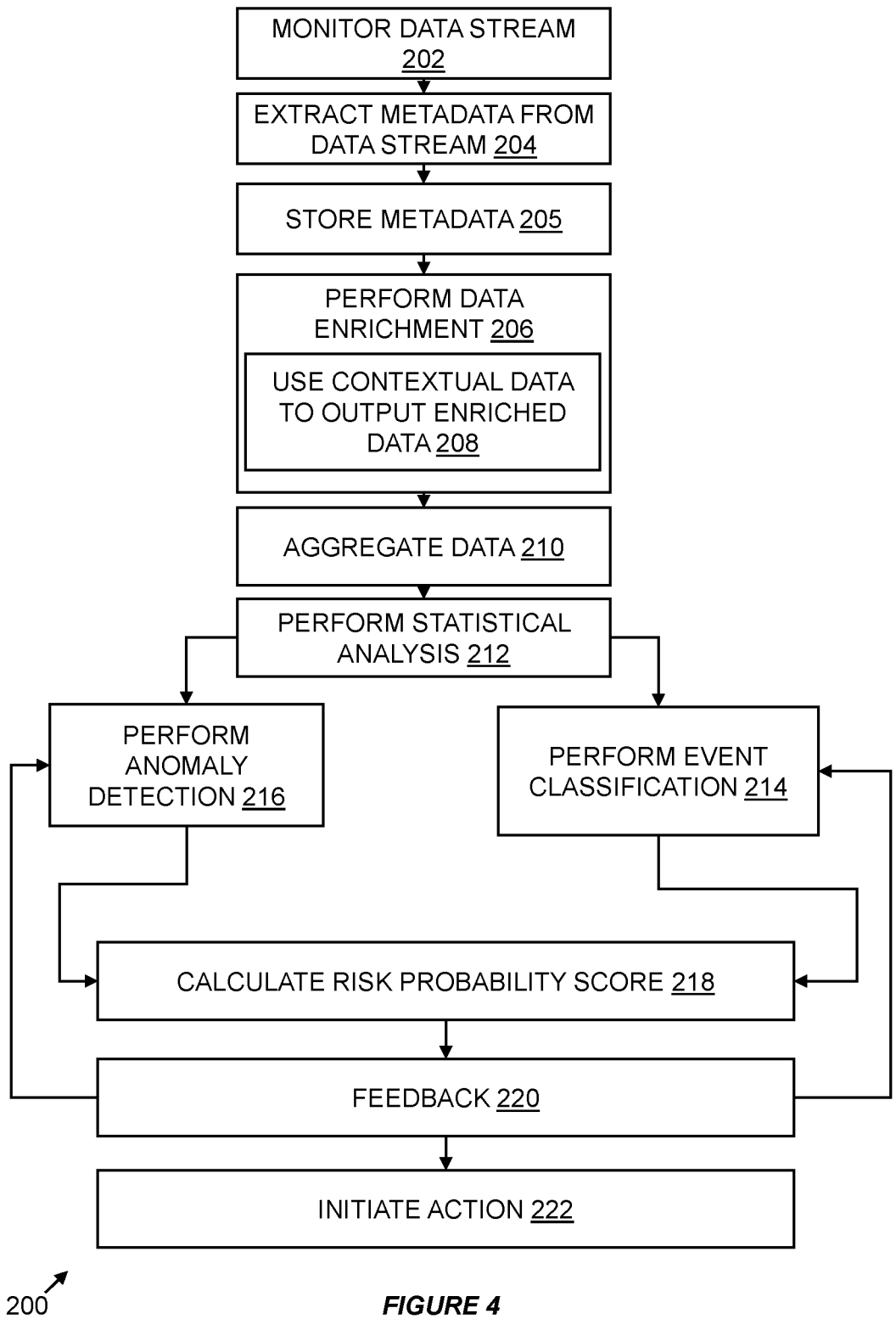
FIG. 4 is a flow diagram which illustrates an example embodiment of a threat detection method according to aspects of the present disclosure.

The system (100) described above may implement a threat detection method. FIG. 4 is a flow diagram which illustrates an example threat detection method (200) according to aspects of the present disclosure. The method may be conducted by a suitable computing device, such as a threat detection apparatus, connected to a network (103).

The method may include monitoring (202) a data stream on the network (103) to extract (204) metadata therefrom. The monitoring may be passive monitoring of traversing communications on the M2M network (103). The data stream metadata extracted from the network (103) may include data points relating to internal signals or internal signal events. Extracting the metadata may include performing signal extraction to isolate the most significant data attributes associated with signals, which may then be used for analysis. As mentioned, the data stream may include encrypted message data (e.g. contained in a payload) and non-encrypted metadata (e.g. contained in a header). Extracting the metadata may include extracting the non-encrypted metadata from the data stream.

The method includes storing (205) the metadata in a storage component (115). The storage component may be an in-memory storage component for fast access to the stored metadata. Storing (205) the metadata may include storing the metadata in a key-value store (115A) in which each data point of the metadata is stored in record associated with a key. The key uniquely identifies the record and is usable in finding data stored within the store (115A). The data stream metadata may be stored in the key-value store in association with the transaction, connection, endpoints or the like.

The method includes performing (206) metadata enrichment. Performing metadata or signal enrichment may include using contextual data obtained from other threat monitoring sources, such as a human source (121B) and/or a technical source (121A), to output (208) enriched data. The contextual data may include data points relating to external signals, such as known threat indicators, which may be used to enrich the complete data set prior to probability scoring. The method may include collecting and assessing the contextual data for a level of accuracy and certainty, including tagging a weighted score to the contextual data for use in calculating a risk/threat detection probability score. The external data signals may be collected from one or more external sources, such as a human source (121B) or a technical source (121A). Enrichment (may also be termed signal or data enrichment), may thus use both internal and external intelligence as well as reinforcement learning from expert analysts. The method may include storing the enriched data in the key-value store (115A). The enriched data may be stored in the key-value store in association with the transaction, connection, endpoints or the like.

The method includes aggregating (210) the data including for example multivariate data including one or more of data stream metadata; contextual data received from other sources; and enriched data. Aggregating the data may include aggregating the statistics of all monitored data communications (e.g. relating to the transaction, the devices or the like), regardless of the protocol or encryption type. Aggregating (210) the data may include aggregating data stream metadata and contextual data together. Aggregating the data may including averaging, combining, filtering and otherwise processing metadata and data relating to thousands of packets exchanged pursuant to a single transaction into a single set of aggregated data that relates to and is characteristic of the transaction. Aggregation therefore filters thousands of signals obtained from thousands of packets and other sources into an aggregated data set relating to one transaction. The aggregated data may be termed transaction data and may be scored and analysed. The output of aggregation may be a summary of relevant data points (attributes) from packets, connections and conversations that describe the transaction. The output of the aggregation may be numeric. Aggregated data may be enriched further.

Aggregating (210) the data may have the effect of reducing storage, complexity and speed of processing without losing fidelity. For example, while data stream metadata and contextual data may be obtained for a number of packets exchanged over the network relating to a transaction, and may require gigabytes of storage capacity, aggregation of the data may produce aggregated or transaction data requiring megabytes of storage capacity.

Aggregating the data may include aggregating multiple data stream attributes into a single, highly descriptive data attribute which is placed into a single data record with similar aggregated attributes to synthesize a new high fidelity, data set of significant values describing the encrypted communication or encrypted transaction.

The method may include enriching the aggregated data with contextual data obtained from one or more signal sources such as a human source or a technical source to output enriched aggregated data. The contextual data may describe or relate to threat, vulnerability and/or reputation attributes of the aggregated data; to output further enriched data attributes;

The data set may therefore be aggregated into a high fidelity data set of most-significant attributes. The aggregated data set may be enriched with contextual data obtained from one or more signal sources to output a further enriched data set.

The method may include storing the aggregated data (which may include enriched aggregated data) in the key-value store (115A). The aggregated data may be stored in the key-value store in association with the transaction, connection, endpoints or the like.

The method may include analysing the enriched data and/or aggregated data (which may include enriched aggregated data) using one or more of statistical analysis, machine learning and anomaly detection to calculate the risk probability score. For example, the method includes performing (212) statistical analysis on the metadata and/or data. Performing statistical analysis may include performing statistical analysis based on volumetric, frequency and distribution patterns. The statistical analysis may include time-based statistical analysis performed using mini-batch gradient descent processing. The statistical analysis may include using one or more of: Shewhart Control Charts, Fast-Fourier Transforms, Holt-Winters and Markov Modelling. A Shewhart Control Chart may be used for simple peak detection, which identifies non-standard deviation. Fast-Fourier Transforms may be used to de-noise the internal signal. Holt-Winters may be used for exponential smoothing. Performing statistical analysis may include outputting data points relating to the analysis and storing the data points in the key-value store (115A), e.g. in association with the transaction, connection and/or endpoints. Statistical analysis may be performed on one or more of the aggregated data, the enriched data and the data stream metadata. The analysis findings (e.g. outlier deviation score) may be used to enrich the aggregated data. The patterns of outliers can also be processed.

For example, the method includes performing (214) event classification. This may include using Naïve Bayes and may include classifying each event as either malicious or non-malicious. Performing event classification may include inputting one or both of enriched and aggregated data and optionally the output of statistical analysis and outputting data points relating to one or more of: event classification; classification probability; event risk rating; event description; and the like. Performing event classification may include training classification models (supervised) with both enriched data and metadata attributes, with historic or synthesized data sets, to improve classification accuracy and reduce false positives and false negatives. The resultant output may include event classification, classification probability score, event risk rating (in terms of probability and impact), correlated events, co-occurring events and the like. The method may include storing the data points in the key-value store (115A), e.g. in association with the transaction, connection and/or endpoints.

For example, the method includes performing (216) anomaly detection, using for example n-Grams. Performing anomaly detection may include inputting one or both of enriched and aggregated data and optionally the output of statistical analysis and outputting data points relating to one or more of: event anomalous score; anomaly detection method; associated risk rating; event description; and the like. Anomaly detection may be based on an unsupervised model which processes data sets; using previous (historic) data records to predict a range of expected values in each future data record being processed. When a data record is received which is not within the predicted range, it is flagged as an exception, or an anomaly. The method may include storing the data points in the key-value store (115A), e.g. in association with the transaction, connection and/or endpoints.

The method includes calculating (218) a risk or threat probability score. Calculating the risk or threat probability score may include using a weighted score tagged to the contextual data. Calculating the probability score may include using one or both of the outputs of the anomaly detection and event classification and outputting a risk or threat probability score associated with the metadata. Calculating (218) the risk or threat probability score may include using Markov-Modelling to determine risk or threat probability score.

The method includes feeding back (220) one or more of the metadata, data (e.g. including contextual data, enriched data, aggregated data, etc.) and associated scores, detections, classifications and the like into the system to enhance future threat predictions. This may for example include using a reinforcement learning feedback loop to continuously improve detection accuracy. Both false positives and negatives are fed back as training data to improve machine learning classification. Additionally, each data attribute used for the initial weighted probability scoring may be revaluated to improve future threat detection/risk probability scoring. Example feedback operations are described in greater detail below with reference to FIGS. 9A and 9B The method may include initiating (222) one or more actions based on the threat detection or threat assessment or the risk or threat probability score. Initiating the one or more actions may include initiating an action in accordance with the risk probability score so as to mitigate one or more threats present on the network. Initiating the action may be dependent on the risk or threat probability score. For example, different actions may be initiated based on different scores. The method may include initiating one or more of the following actions: contain threat activity; create threat detection alert; allow connection; whitelist; blacklist and the like. Whitelisting and blacklisting may include whitelisting or blacklisting, as the case may be, one or more data points or data attributes present in the metadata (e.g. source IP, destination IP, etc.).

The steps of the method described in the foregoing may be performed using a key-value store (115A) and an in-memory database for high-speed real-time processing.

The method described above may be performed without inspection or decryption of encrypted message data.

Figure 5:
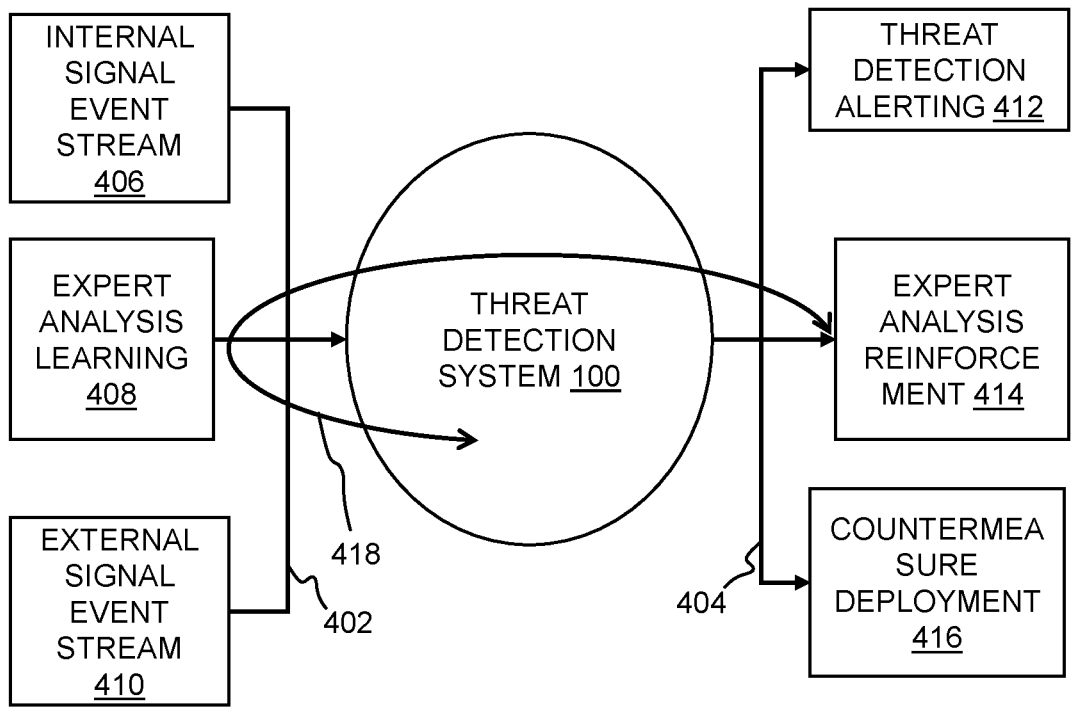
FIG. 5 is a schematic diagram which illustrates inputs and outputs to the threat detection system and method according to aspects of the present disclosure.

FIG. 5 is a schematic diagram which illustrates inputs (402) and outputs (404) to the threat detection system (100) and method according to aspects of the present disclosure. Inputs may include an internal signal event stream (406), expert analysis learning (408) and an external signal event stream (410). The internal signal event stream may be obtained from internal signals, including for example any type of M2M environment such as a computer, IoT, or POS (point of sale) network or the like. Once the system (100) performs the signal extraction isolating the most significant data attributes (e.g. from the internal event signal stream) to be used for analysis, external data signals, from the external signal event stream (410), such as known threat indicators, are used to enrich the complete data set prior to probability scoring. This external data is also used to provide context to threat detection alerts, data visualisations and system reports. Outputs (404) may include threat detection alerting (412), expert analysis reinforcement (414) and countermeasure deployment (416). There may be a feedback loop (418) that extends between the expert analysis reinforcement and the expert analysis learning to improve overall performance of the system over time.

Figure 6:
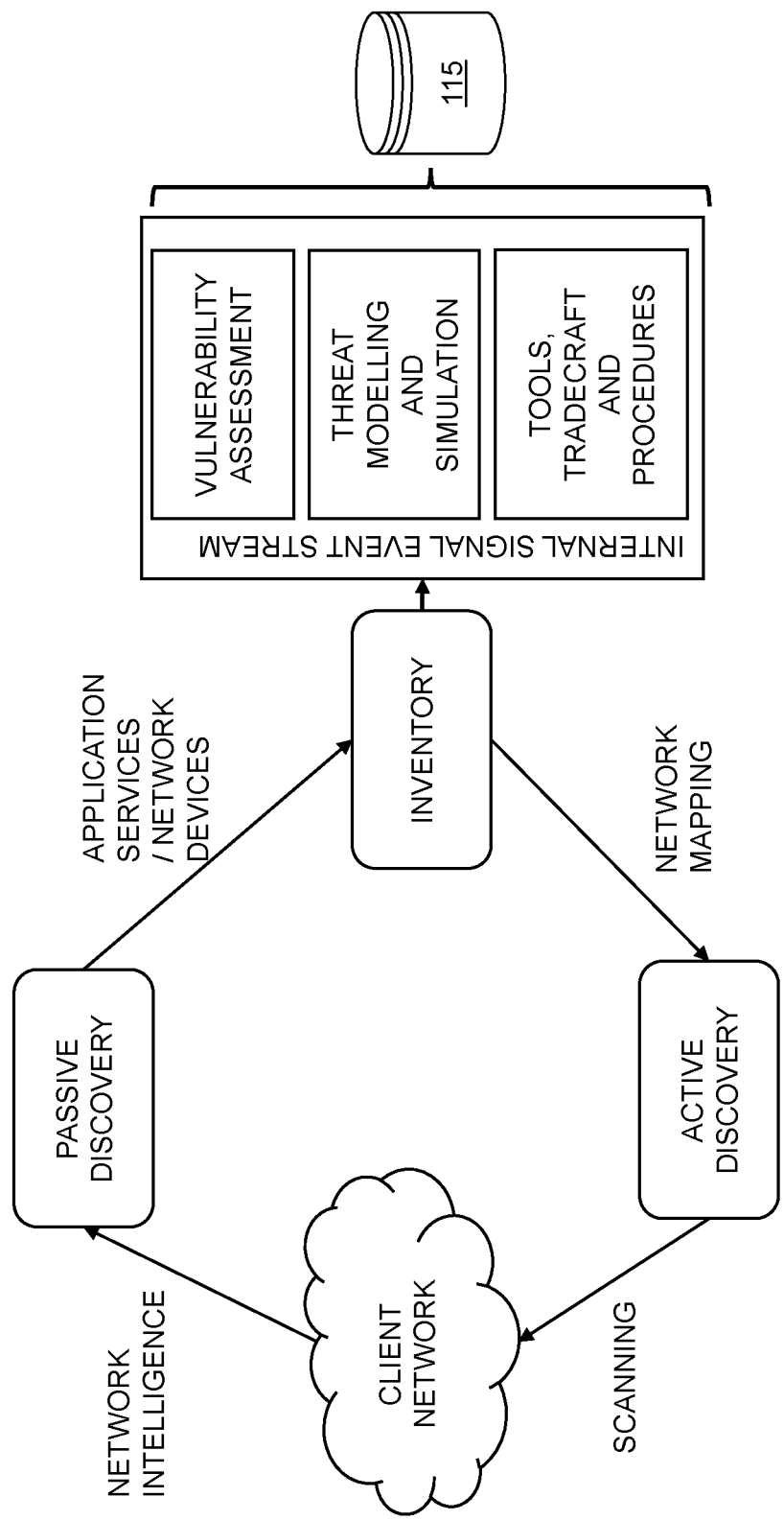
FIG. 6 is a schematic diagram which illustrates internal signal event data acquisition according to aspects of the present disclosure.

FIG. 6 is a schematic diagram which illustrates internal signal event data acquisition operations according to aspects of the present disclosure. The data acquisition procedure may include maintaining a software and/or asset inventory using active and passive discovery on a network. Active discovery may include scanning the network while passive discovery may include network intelligence. The inventory may obtain application services and/or network devices via the passive discovery and may perform network mapping via active discovery. Data points from the inventory may form part of the internal signal event stream and may be used for one or more of: vulnerability assessment; threat modelling and simulation; and TTP, outputs of which may be stored in the storage component (115) for high-speed, real-time processing using an in-memory key-value store.

Further to the monitoring of communications as described in the foregoing, the system and method described herein may be configured to process additional internal signal inputs in the internal signal event data acquisition procedure. These additional inputs may include emerging or newly connected (and potentially rogue or compromised) devices, software vulnerabilities, attack simulation data patterns leveraging threat modelling and/or attacker TTPs (tools, tradecraft and procedures). These inputs may be statically and dynamically created by the system using active and passive network enumeration techniques. The system may for example fingerprint devices, software and applications using passive analysis, as well as identify known-vulnerabilities (e.g., outdated and vulnerable firmware versions) leveraging vulnerability and exploit databases. The system uses active dynamic analysis to discover new or custom application vulnerability, such as command injection or a buffer overflow, through enumeration and intelligent fuzzing. Known attack patterns may be simulated within the M2M network to assist system classification model accuracy using reinforcement learning. This may be performed by an automated attack "kill-chain" simulator using threat actor tools, sanitized for security, within the M2M network to train the classifier and improve accuracy.

Figure 7:
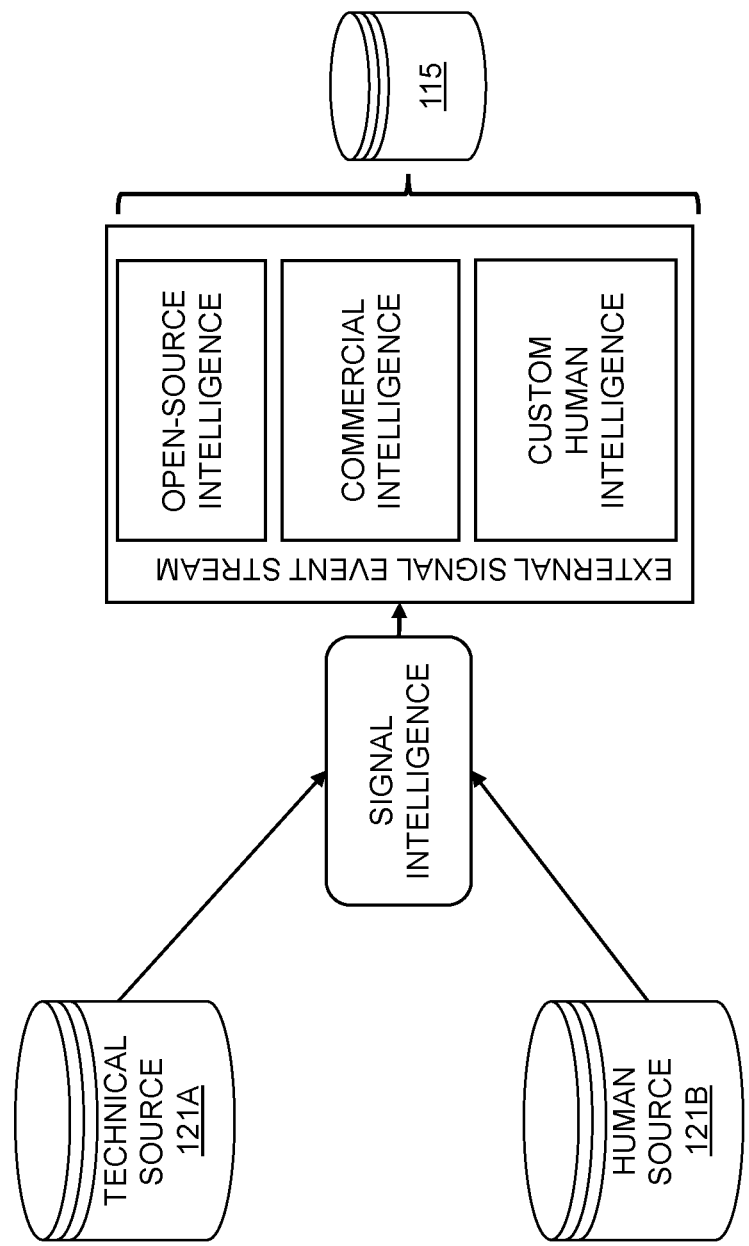
FIG. 7 is a schematic diagram which illustrates external signal event data acquisition operations according to aspects of the present disclosure.

The threat intelligence that drives this automated subsystem is provided by external signal inputs, as illustrated in FIG. 7. The external event data acquisition procedure illustrated in FIG. 7 includes obtaining external signal inputs from one or both of a human source (121B) and a technical source (121A). The human source may include one or more of dark web, social, media and forum sources. The technical source may include one or more of vulnerability, detection, indicator and tradecraft sources. The external event data acquisition procedure may include performing signal intelligence on the input signal obtained from these sources. This may include grouping the signal inputs into groups including, for example: one or more indicators; threats; campaigns; and incidents. Indicators may include one or more of: IP address; DNS name; URL/URI; MD5/SHA1; and the like. Threats may include one or more of: actor; group; malware; vulnerability; and the like. Campaigns may include one or more of: state sponsored; espionage; hacktivism; cybercrime; and the like. Incidents may include one or more of: financial; industrial; defence; and the like. These groupings of signal inputs may form part of the external signal event stream. Although the data sources that feed this input stream are continuously evolving there may be three types of sources. The first is open source data, these do not only include community sources but social media, internet forums and Dark Web marketplaces are all used. Commercial sources are provided by specialized threat analysts and service providers. Custom human intelligence may be provided in the form of manual inputs learned through daily client, M2M security event and cyber threat monitoring. These signal inputs may be stored in the storage component (115) for high-speed, real-time processing using an in-memory key-value store.

Figure 8:
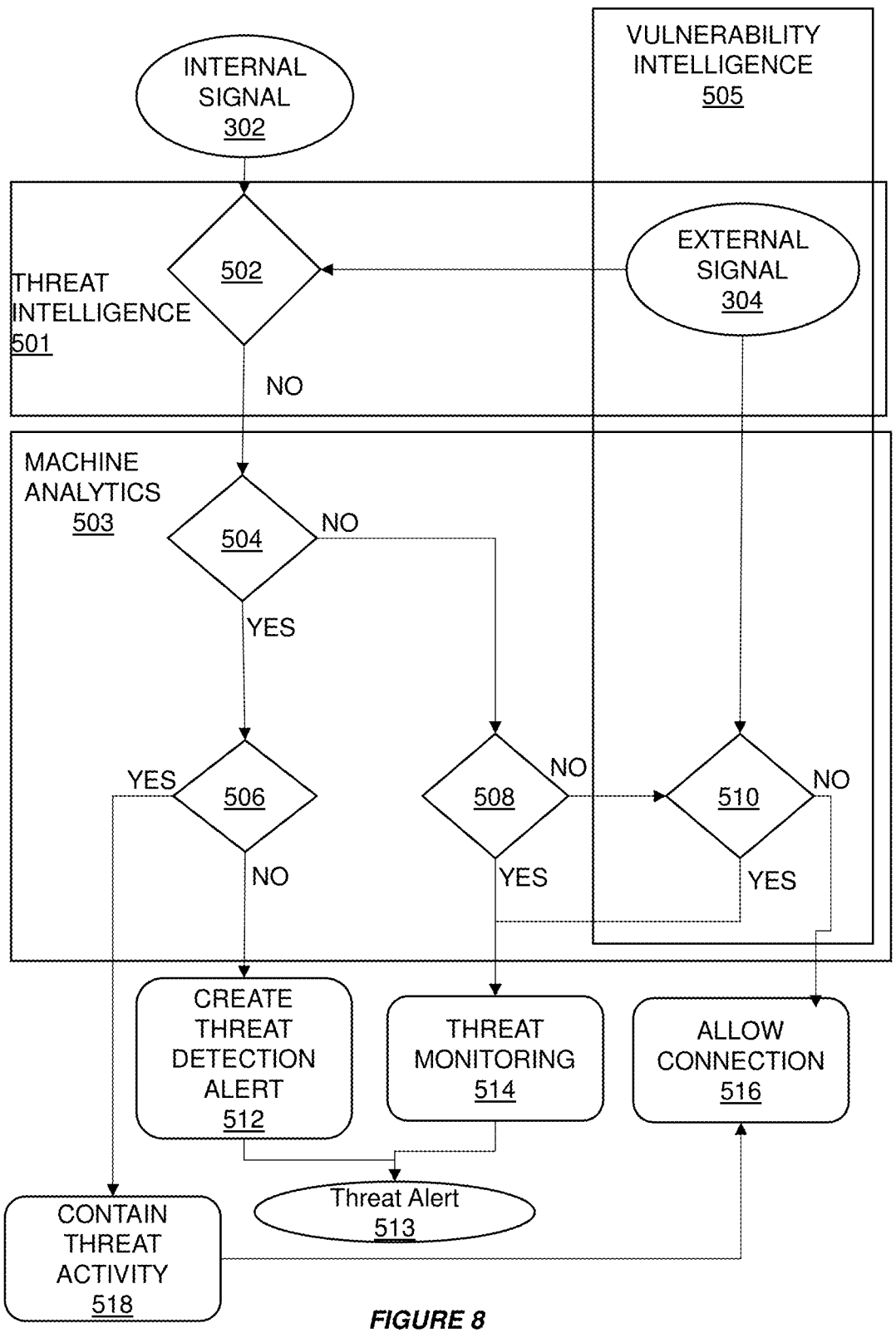
FIG. 8 is a flow diagram which illustrates a method for threat detection, including threat assessment and actioning, according to aspects of the present disclosure.

The system and method described herein correlates all inputs for analysis every time a M2M connection occurs. FIG. 8 is a flow diagram which illustrates a method for threat detection, including threat assessment and actioning, according to aspects of the present disclosure. The method includes making use of vulnerability intelligence (505), threat intelligence (501) and machine analytics (503) for threat detection and actioning. The method includes, as a part of the threat intelligence (501) analysis, receiving or obtaining an internal signal (302) and an external signal (304) related to a particular connection or transaction on the network (103) and determining if data points (or metadata) associated with the signals have been blacklisted (502). If the method determines that one or more data points have been blacklisted (502), a threat activity may be detected and a threat alert may be triggered, the threat activity may be contained, or the like.

If none of the data points are blacklisted (502), the method may include, as a part of a machine analytics (503) process, evaluating the signal (or data points constituting the signal) for malicious activity (504). If malicious activity (504) is detected, the method may include determining whether there is an automated response (506) for the threat detection. If an automated response (506) is identified for the threat, the method may include containing (518) the threat activity in accordance with the automated response (506). This may include allowing (516) the connection, if appropriate. If no automated response (506) is identified, the method may include creating (512) a threat detection alert and outputting the threat alert (513).

If malicious activity is not detected (504), the method may include evaluating (508) the signal (or data points constituting the signal) for anomalies. If anomalies are detected, the method includes initiating threat monitoring (514) and outputting a threat alert (513) as may be required. If anomalies are not detected, the method may include evaluating (510) the signal (or data points constituting the signal) for vulnerability. If vulnerabilities are detected or identified, the method may include initiating threat monitoring (514) and outputting a threat alert (513) as may be required. If no vulnerabilities are detected or identified, the method may include allowing (516) the connection.

In the method described above with reference to FIG. 7, the external signal (304) and blacklist may form part of the threat intelligence (501). The external signal and vulnerability analysis (510) may form part of the vulnerability intelligence (505). The method described above may allow for either the alerting of potential malicious activity or the proactive disabling of threat actor communication and degradation of malicious software (e.g., exploit code) toolsets. The threat detection system and method described herein uses vulnerability and threat data which are both dynamically created and statically imported. This may provide a hybrid threat detection engine which uses an expert engine (e.g. based on known threat or vulnerability indicators) and machine learning classification for threat (and anomaly) detection. This approach does not require access to the user's sensitive data, encryption key or M2M network protocol used.

As mentioned, the system and method described herein may include providing feedback for reinforcement learning to improve accuracy and reduce false positives and false negatives. The feedback may be in the form of new training data.

Figure 9A:
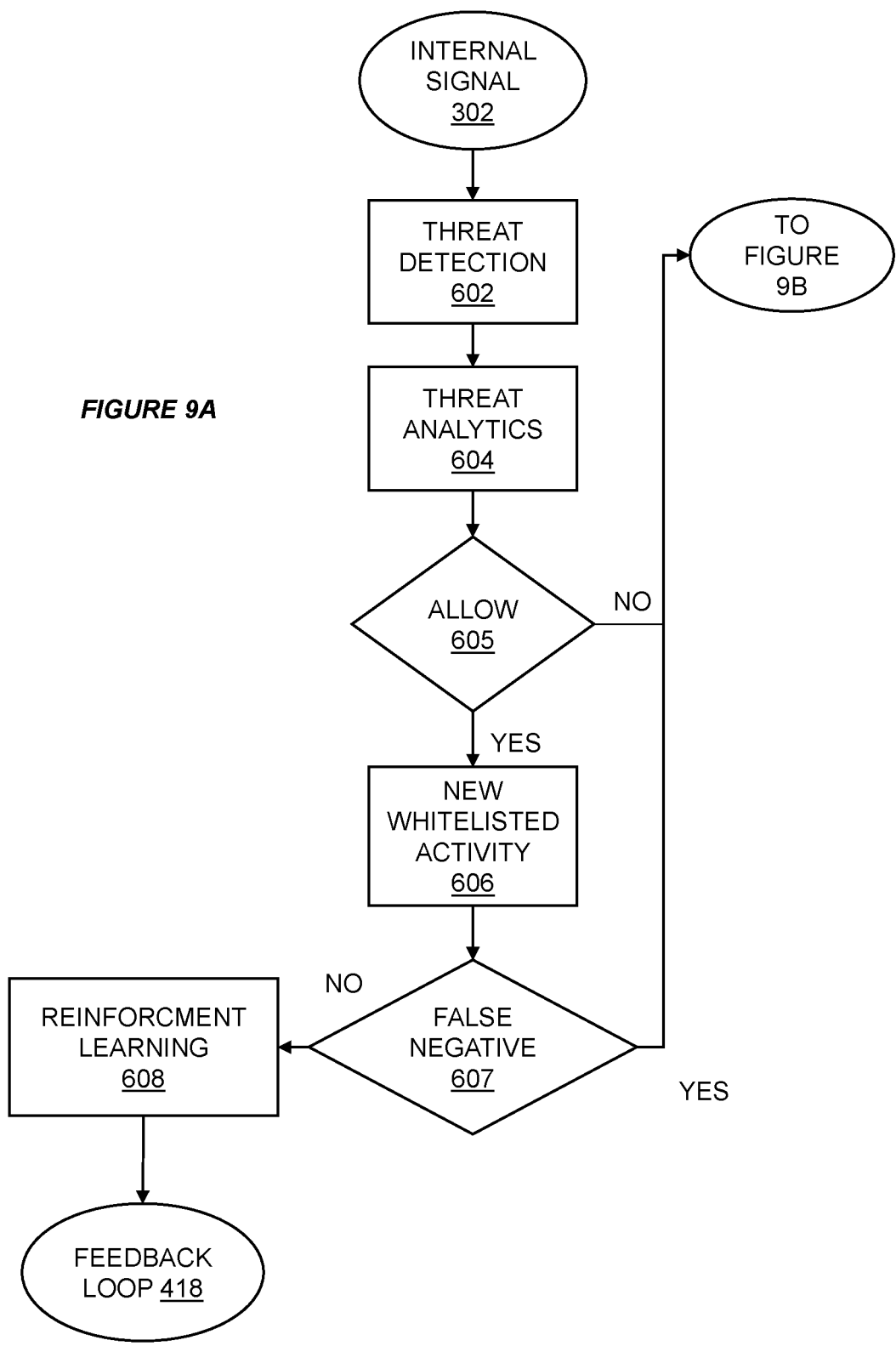
FIG. 9A is a first part of a two-part flow diagram which illustrates a reinforcement learning method which uses a feedback loop according to aspects of the present disclosure.
Figure 9B:
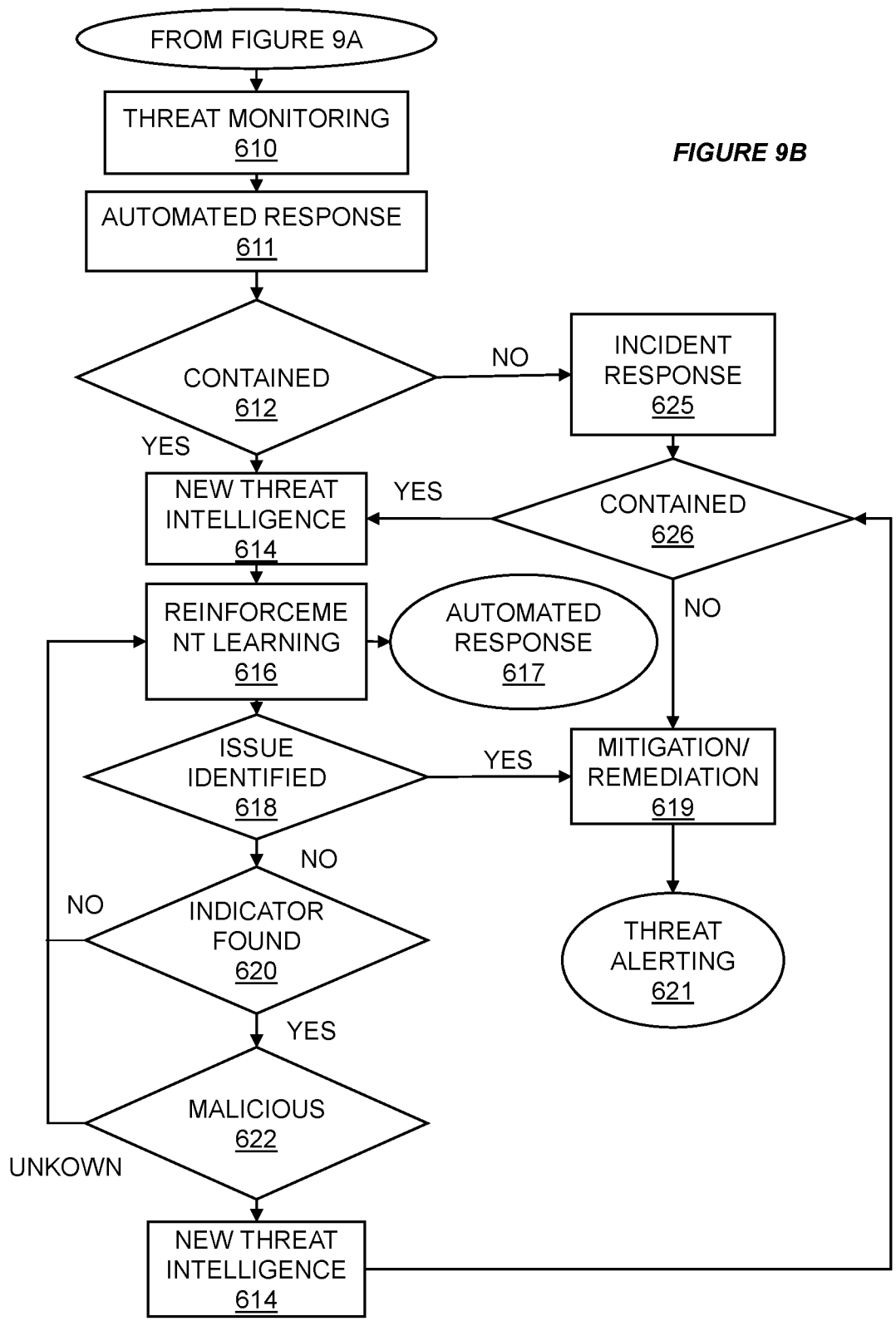
FIG. 9B is a second part of the two-part flow diagram which illustrates a reinforcement learning method which uses a feedback loop according to aspects of the present disclosure; and, FIG. 10 illustrates an example of a computing device in which various aspects of the disclosure may be implemented.

FIGS. 9A and 9B illustrate an example embodiment of a reinforcement learning method which uses a feedback loop to reduce false positives and negatives according to aspects of the present disclosure. The method may include receiving or obtaining an internal signal (302) (or data points constituting an internal signal). The method includes performing (602) threat detection analysis on the internal signal (302). The method may include performing (604) threat analytics on the internal signal and/or on data points generated as a part of the threat detection process. The method includes determining (605) whether or not to allow a connection associated with the internal signal. This determining may be based on outputs of one or both of the threat detection (602) and threat analytics (604). If (605) the connection is allowed, the method may include creating (606) a new whitelist activity associated with the internal signal (302). The method may further include determining (607) whether the decision to allow the connection was a false negative. If (607) not a false negative, the method includes feeding (608) this result and the decision and data points relating to the internal signal on which the decision was based into a reinforcement learning process which forms part of the feedback loop (418).

If (605) the connection is not allowed or if (607) a false negative is detected, the method may include initiating threat monitoring (610) and containing any threat detection in accordance with an automated response (611), if any.

If (612), the threat is contained, the method may include creating (614) new threat intelligence based on the response, the threat, and data points associated with the internal event and inputting (616) the new threat intelligence and/or data on which the threat intelligence is based into a reinforcement learning process to output an updated automated response (617) corresponding to the new threat intelligence.

If (612) the threat is not contained via the automated response, the method may include initiating (625) incident response and then determining (626) whether the threat is contained in response to the incident response.

If (626) contained in response to the incident response, the method may include creating (614) new threat intelligence based on the response, the threat, and data points associated with the internal event and inputting (616) the threat intelligence and/or data on which the threat intelligence is based into a reinforcement learning process to output an automated response (617) corresponding to the new threat intelligence.

If (626) not contained in response to the incident response, the method may include performing (619) mitigation/remediation and outputting new threat alerting (621) based on the response, the threat, and data points associated with the internal event.

Reinforcement learning (616) may include identifying issues (618), searching for indicators (620) and flagging them as malicious (622) to: create new threat intelligence (614), continue the reinforcement learning (616) or initiate mediation/remediation (619).

The method described above thus includes using external signal data to classify malicious activity, metadata attributes are fed back into the method labelled as malicious. These feedback inputs are used to train the system's classifiers to improve threat detection accuracy.

In this manner, each connection passes through each gate. If deemed malicious, the connection is flagged. Once flagged as malicious, apparently innocent data attributes are submitted for reinforcement learning. However, if nothing is flagged the connection is left alone to proceed unaffected, as it is deemed legitimate, non-malicious. The innocent, non-malicious data attributes associated with the connection are used for reinforcement learning to raise the non-malicious score associated with the endpoint, connection and/or transaction.

The system and method described herein detects, and may proactively mitigate, high-risk events in real-time within encrypted communication flows, without the requirement for decryption, protocol dissection or DPI. Encrypted data streams may be passively intercepted, and threats detected using "in-flight" stream analytics with enriched communication metadata. Data enrichment may use both internal and external intelligence as well as reinforcement learning from expert analysts. The analytics process uses aggregated multivariate data, statistical analysis, anomaly detection and semi-supervised classification to derive a (risk) probability score for each encrypted transaction and/or machine profile.

Figure 10:
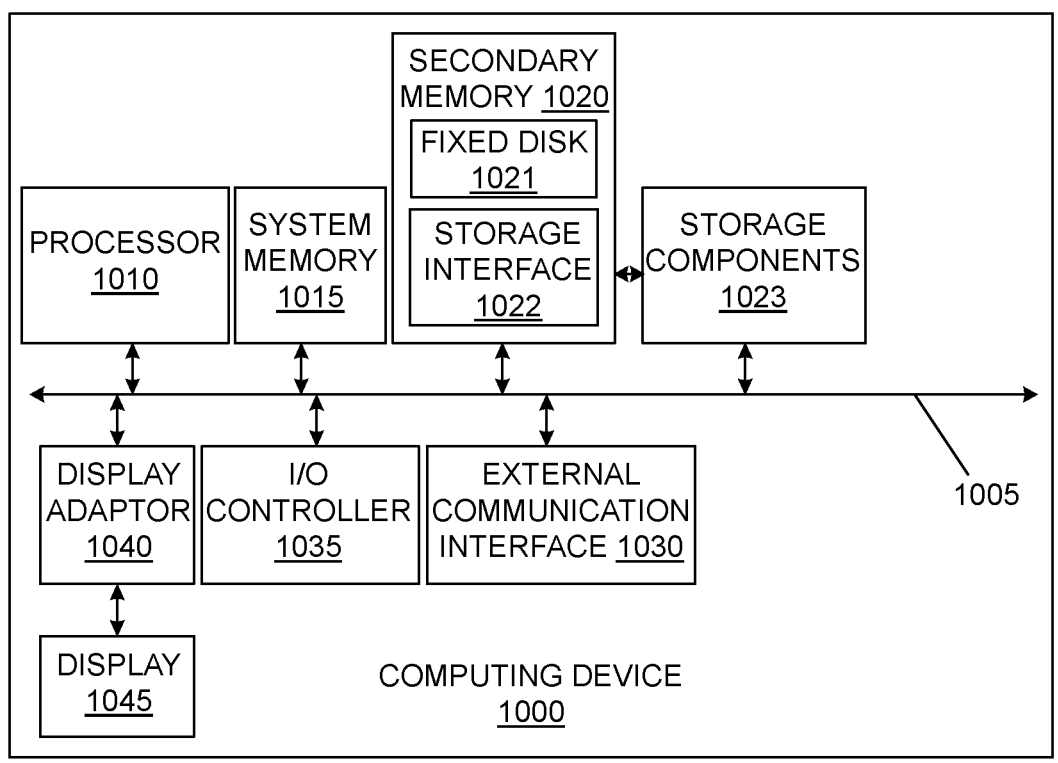

FIG. 10 illustrates an example of a computing device (1000) in which various aspects of the disclosure may be implemented. The computing device (1000) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (1000) may be suitable for storing and executing computer program code. The various participants and elements in the previously described system diagrams may use any suitable number of subsystems or components of the computing device (1000) to facilitate the functions described herein. The computing device (1000) may include subsystems or components interconnected via a communication infrastructure (1005) (for example, a communications bus, a network, etc.). The computing device (1000) may include one or more processors (1010) and at least one memory component in the form of computer-readable media. The one or more processors (1010) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (1000) may be distributed over a number of physical locations (e.g. in a distributed, cluster or cloud-based computing configuration) and appropriate software units may be arranged to manage and/or process data on behalf of remote devices.

The memory components may include system memory (1015), which may include read only memory (ROM) and random access memory (RAM). A basic input/output system (BIOS) may be stored in ROM. System software may be stored in the system memory (1015) including operating system software. The memory components may also include secondary memory (1020). The secondary memory (1020)

may include a fixed disk (1021), such as a hard disk drive, and, optionally, one or more storage interfaces (1022) for interfacing with storage components (1023), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (1000) may include an external communications interface (1030) for operation of the computing device (1000) in a networked environment enabling transfer of data between multiple computing devices (1000) and/or the Internet. Data transferred via the external communications interface (1030) may be in the form of signals, which may be electronic, electromagnetic, optical, radio, or other types of signal. The external communications interface (1030) may enable communication of data between the computing device (1000) and other computing devices including servers and external storage facilities. Web services may be accessible by and/or from the computing device (1000) via the communications interface (1030).

The external communications interface (1030) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (1010). A computer program product may be provided by a non-transient or non-transitory computer-readable medium, or may be provided via a signal or other transient or transitory means via the communications interface (1030).

Interconnection via the communication infrastructure (1005) allows the one or more processors (1010) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (1000) either directly or via an I/O controller (1035). One or more displays (1045) (which may be touch-sensitive displays) may be coupled to or integrally formed with the computing device (1000) via a display or video adapter (1040).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. Components or devices configured or arranged to perform described functions or operations may be so arranged or configured through computer-implemented instructions which implement or carry out the described functions, algorithms, or methods. The computer-implemented instructions may be provided by hardware or software units. In one embodiment, a software unit is implemented with a computer program product comprising a non-transient or non-transitory computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations, such as accompanying flow diagrams, are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention set forth in any accompanying claims.

Finally, throughout the specification and any accompanying claims, unless the context requires otherwise, the word 'comprise' or variations such as 'comprises' or 'comprising' will be understood to imply the inclusion of a stated integer or group of integers but not the exclusion of any other integer or group of integers.

The invention claimed is:

1. A computer-implemented method for threat detection for encrypted communications, the method comprising:
    monitoring a data stream in a network, the data stream including encrypted message data and non-encrypted metadata associated with the encrypted message data being transmitted between endpoints on the network;

extracting data points from the non-encrypted metadata and storing the non-encrypted metadata data points in an in-memory key-value store;

enriching the non-encrypted metadata data points with contextual data relating to one or more of threat, vulnerability and reputation data points and being obtained from one or more signal sources to output enriched data and storing the enriched data in the in-memory key-value store;

analysing the enriched data to calculate a risk probability score associated therewith; and, initiating an action in accordance with the risk probability score so as to mitigate a threat present on the network.

2. The method as claimed in claim 1, including storing one or more of the non-encrypted metadata data points, the enriched data and aggregated data in an in-memory storage component for fast access.

3. The method as claimed in claim 2, including storing the one or more of non-encrypted metadata data points, enriched data and aggregated data in a key-value store in which each data point is stored in a record associated with a key.

4. The method as claimed in claim 1, wherein analysing the enriched data includes using one or more of statistical analysis, machine learning and anomaly detection to calculate the risk probability score.

5. The method as claimed in claim 1, wherein analysing the enriched data includes performing statistical analysis on the enriched data, wherein performing statistical analysis includes performing statistical analysis based on volumetric, frequency and distribution patterns, wherein the statistical analysis includes time-based statistical analysis performed using mini-batch gradient descent processing, wherein the statistical analysis includes using one or more of: Shewhart Control Charts, Fast-Fourier Transforms, Holt-Winters and Markov Modelling.

6. The method as claimed in claim 1, wherein analysing the enriched data includes performing anomaly detection on the enriched data.

7. The method as claimed in claim 6, wherein performing anomaly detection includes inputting one or both of enriched and aggregated data and outputting data points relating to one or more of: event anomalous score; anomaly detection method; associated risk rating; and event description.

8. The method as claimed in claim 1, wherein analysing the enriched data includes performing event classification on the enriched data.

9. The method as claimed in claim 8, wherein performing event classification includes inputting one or both of enriched and aggregated data and outputting data points relating to one or more of: event classification; classification probability; event risk rating; event description; and the like.

10. The method as claimed in claim 1, including collecting and assessing the contextual data for a level of accuracy and certainty, including tagging a weighted score to the contextual data for use in calculating the risk probability score.

11. The method as claimed in claim 1, wherein calculating the risk probability score includes using outputs of one or both of event classification and anomaly detection.

12. The method as claimed in claim 1, wherein calculating the risk probability score includes using Markov-Modelling to determine risk probability score.

13. The method as claimed in claim 1, wherein calculating the risk probability score includes using a weighted score tagged to the contextual data.

14. The method as claimed in claim 1, including aggregating the enriched data to output aggregated data, including aggregating statistics of monitored data communications on the network, wherein analysing the enriched data includes analysing the aggregated data.

15. The method as claimed in claim 1, wherein initiating the action includes initiating one or more of the following actions: containing threat activity; creating a threat detection alert; allowing a connection; whitelisting; and blacklisting.

16. The method as claimed in claim 1, wherein the one or more signal sources from which the contextual data is obtained includes a human source and a technical source.

17. The method as claimed in claim 1, including providing feedback for reinforcement learning to improve accuracy and reduce false positives and false negatives, wherein the feedback is in the form of new training data.

18. The method as claimed in claim 1, wherein the encrypted message data transmitted in the data stream is not intercepted or analysed.

19. A system for threat detection for encrypted communications comprising: a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

monitoring a data stream in a network, the data stream including encrypted message data and non-encrypted metadata associated with the encrypted message data being transmitted between endpoints on the network;

extracting data data points from the non-encrypted metadata and storing the non-encrypted metadata data points in an in-memory key-value store;

enriching the non-encrypted metadata data points with contextual data relating to one or more of threat, vulnerability and reputation data points and being obtained from one or more signal sources to output enriched data and storing the enriched data in the in-memory key-value store;

analysing the enriched data to calculate a risk probability score associated therewith; and, initiating an action in accordance with the risk probability score so as to mitigate a threat present on the network.

20. A computer program product for threat detection for encrypted communications, the computer program product comprising a non-transitory computer-readable medium having stored computer-readable program code for performing the steps of:

monitoring a data stream in a network, the data stream including encrypted message data and non-encrypted metadata associated with the encrypted message data being transmitted between endpoints on the network;

extracting data points from the non-encrypted metadata and storing the non-encrypted metadata data points in an in-memory key-value store;

enriching the non-encrypted metadata data points with contextual data relating to one or more of threat, vulnerability and reputation data points and being obtained from one or more signal sources to output enriched data and storing the enriched data in the in-memory key-value store;

analysing the enriched data to calculate a risk probability score associated therewith; and, initiating an action in accordance with the risk probability score so as to mitigate a threat present on the network.

* * * * *